METHOD OF MANUFACTURING MULTIPLE MAGNETIC HEADS FOR RECORDING

Filed April 7, 1966

INVENTORS
JULES BOS
JACOB KOORNEEF
GEORGE L. WALTHER
BY
Frank R. Jifani
AGENT

United States Patent Office 3,495,325

Patented Feb. 17, 1970

3,495,325

METHOD OF MANUFACTURING MULTIPLE MAGNETIC HEADS FOR RECORDING

Jules Bos, Jacob Koorneef, and George Ludwig Walther, Emmasingel, Eindhoven, Netherlands, assignors, by mesne assignments to U.S. Philips Corporation, New York, N.Y., a corporation of Delaware

Filed Apr. 7, 1966, Ser. No. 540,887

Claims priority, application Netherlands, Apr. 22, 1965, 6505084

Int. Cl. G11b *5/42*

U.S. Cl. 29—603 6 Claims

ABSTRACT OF THE DISCLOSURE

A method of manufacturing a shielded magnetic head including the steps of forming a unitary head portion, inserting a shielding packet, and removing the upper portion of the magnetic material until the shielding packet separates the remaining head portions.

This invention relates to methods of manufacturing multiple magnetic heads for recording, reproducing and/or erasing one track or a plurality of parallel tracks of magnetic recordings on a record carrier. Such a head comprises at least two cores which are mechanically joined, each having at least one useful gap filled with non-magnetisable material. The non-magnetic material also attaches together the parts of the core located on each side of the gap, the positions of the gaps being exactly defined with respect to one another, and the cores being connected together by means of a shielding packet which possibly extends into the front surface of the head.

It belongs to the prior art in multiple magnetic heads of the kind above referred to, to separate magnetically the juxtaposed magnetic cores each gap of which governs one of two or more parallel tracks of magnetic recordings, by means of unmagnetisable material. To this end, first packets of alternately magnetisable and unmagnetisable material are manufactured by attaching together plates of these materials with the use of a solder. These packets are sawn to form the desired core-parts which are provided with accurately planed surfaces which may serve as gap-bounding surfaces. Subsequently the gaps are formed, for example, by providing glass between said surfaces and pressing the latter against one another while heating, until the desired length of gap is obtained.

It has previously been suggested that the magnetic cores, which are located one after another in the direction of movement of the record carrier, the useful gaps of different cores thus governing the same track, should be relatively shielded by means of a shielding packet. As viewed in the direction of movement of the record carrier, such a packet comprises, for example, plates located one after another and consisting of successively unmagnetisable material, material of good electric conductivity such as, for example, silver, well magnetisable material, etc. A method of manufacturing such a multiple magnetic head has also been suggested in which first the shielding packet is made by attaching the various layers together with the use of a suspension of enamel, the suspension being heated to approximately 750° C. Then the gaps are formed in the usual manner on each side of the shielding packet while locally heating to a temperature at which the gap-filling material (usually glass in actual gaps) melts.

Both said methods have the important disadvantage that *first* a packet of plates is composed and *then* the gaps are formed between each two parts of well magnet-for the composition of the packet of plates and for the formation of a filled gap. A heating temperature of approximately 600° C. is necessary, for example, for manufacturing the gaps. Since in known methods such heating invariably takes place on part of the finished packet, it is impossible to avoid a certain influence of this heating on the attachments within the packet and on the attachment of the packet as a whole to the cores. Due to the large range of temperatures occurring during this heating process, considerable stresses occur in the materials at the said attachments, thus frequently giving rise to breakage. More particularly if the melting temperatures of the attachment means used exceed only slightly that of the gap-filling material, for example, when using the said enamel suspension, a second disadvantage is involved the means of attachment begins slightly to soften. This means more particularly for gaps upon which severe requirements are imposed with regard to, for example, parallelity or exact alignment, that these requirements are generally not satisfied any longer. Consequently the use of said methods results in a considerable percentage of loss in the manufacture.

The present invention describes a method by which multiple magnetic heads of the kind above referred to may be manufactured while obviating the said disadvantages which are inherent in conventional methods. To this end, the invention provides a method wherein the useful gaps are formed between each two pars of well magnetisable material which gaps are exactly defined with respect to one another by means of a junction piece. A small gutter is then formed in the junction piece between the gaps to be relatively shielded. In the gutter the shielding packet is secured by means of a cement having a softening point lower than that of the gap-filling material, and the resulting part cut along a plane passing completely through the gutter in the direction of length of the head. Lastly, this plane is given the shape desired for a front surface, the gaps are given the height desired and the magnetic cores are closed.

If, after the shielding packet is arranged in the gutter, the resulting assembly is cut in the said manner, the plane of cutting may possibly extend through the shielding packet cemented in the gutter. This will usually be the case if the shielding packet in the finished head must extend into the front surface. If this is not the case, then in the finished head a record carrier which is running over the front surfaces of the magnetic cores will not be supported between the two cores by said shielding packet. If desired, the open space which then exists between the end of the shielding packet located on the side of the front surface and the front surfaces of the magnetic cores imagined to extend above said space may be filled with unmagnetisable material. As an alternative, this unmagnetisable material may already be provided at an earlier stage, namely by placing and then attaching it in the gutter before the shielding packet is placed in it. The cutting of the resulting assembly through the gutter then preferably takes place through the unmagnetisable material.

The new method underlies recognition of the fact that is its very advantageous if the gaps can first be fixed with respect to one another and then remain accurately fixed during the subsequent heating process to be used. To this end, it is necessary that the temperature occurring during the second heating process is considerably lower than that during the first process in order that undesirable stresses in the core parts resulting from the second heating process are prevented and the gap-filling material does not melt or even just softens.

Such a sequence of operations is found to be very well possible. The materials used as gap-filling materials have to satisfy special conditions with regard to resistivity to wear and coefficient of expansion in the relevant range of temperatures. These two magnitudes of the said materials must be matched as well as possible to those of the gap-bounding material in order to prevent difference in wear and the occurrence of stresses. Furthermore the resistivity to wear must be high in absolute value, in order to maintain constancy of the height of gap which has been accurately fixed. Known materials which satisfy these requirements such as, for example, beryllium-copper, glass etc., all have a high melting point (approximately 900° C. and, for example, approximately 600° C. respectively) and it is a simple matter to find cementing means of much lower-melting temperature for attaching the shielding packet as a whole or in loose parts in the said gutter; such cementing means may be, for example, epoxy resins, the softening point of which is a few hundreds of degrees Celcius lower. A cementing means which softens at a lower temperature is satisfactory for such attachments since the requirements with regard to resistivity to wear in absolute value and in suitability in connection with the adjacent materials, as well as those with regard to the coefficient of expansion (smaller range of temperatures) are less severe.

In one embodiment of the method according to the invention it is advantageous if the cement used is a solder having a melting point lower than that of the gap-filling material. With respect to known organic cementing means such as epoxy resins, solder has the advantage that, after solidification, it is more resistant to deformation than the latter after hardening.

In a further embodiment of the method according to the invention a considerable simplification is obtained if the junction piece consists of a similar material to that of the core parts and if it is also provided with gap-bounding surfaces. This also prevents the difficulties with regard to different expansions of the core parts and the junction piece during the heating and subsequent cooling processes by which inaccuracies in the mutual positions of the gaps could be introduced.

If the material used for the junction piece is sintered oxidic ferromagnetic material, and hence more particularly if the core parts also consist of such material, the adhesion of the solder thereto for fastening the shielding packet in the gutter may be improved further if, in another embodiment of the method according to the invention, layers of, for example Cr-Ni and Cu are evaporation-deposited on the inner walls of the gutter. Cr-Ni provides satisfactory adhesion with the sintered oxidic ferromagnetic material. Since it is difficult to solder to Cr-Ni, a layer of Cu is evaporation-deposited on it.

A subject of the invention is also a multiple magnetic head manufactured by one of the methods described above.

It is known that it is advantageous if the shielding between magnetic cores in multiple magnetic heads extends as far as possible over the full height of the head. To this end, in a known method, a shielding packet located in line with the shielding packet ending into the front surface is arranged in the closure piece of the cores. However, this has the disadvantage that the total shielding comprises two parts which, though being directly placed against one another, invariably have a gap between them which detrimentally affects the shielding action.

The method described above permits the manufactuirng of a shielding packet consisting of one piece and in one embodiment of a multiplex magnetic head manufactured by one of the said methods, this head has a shielding packet which extends without interruption at least over the full height of the head.

In order that the invention may be readily carried into effect, it will now be described in detail, by way of example, with reference to the accompanying diagrammatic drawing, in which.

Figure 1:
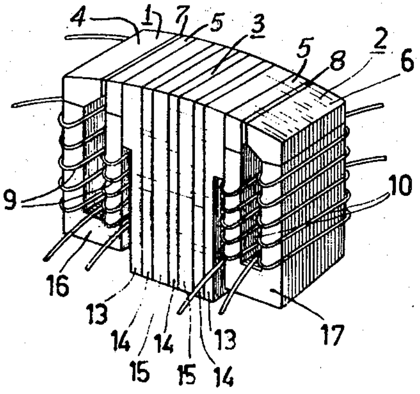
FIGURE 1 is an isometric side view of a multiple magnetic head according to the invention, the gaps of which govern the same track of magnetic recordings.

In FIGURES 1 and 2, and FIGURES 3 and 4 respectively which are associated with one another in pairs, corresponding parts are provided with the same reference numerals.

In FIGURE 1 magnetic cores 1 and 2 are mechanically joined by means of a packet 3 which also magnetically shields the two cores with respect to one another. In this embodiment the packet 3 extends from the front surface without interruption over the full height of the head and even projects from the cores 1, 2 at the lower side. Wire windings associated with the magnetic cores 1 and 2 are indicated by 9 and 10 respectively.

Figure 2:
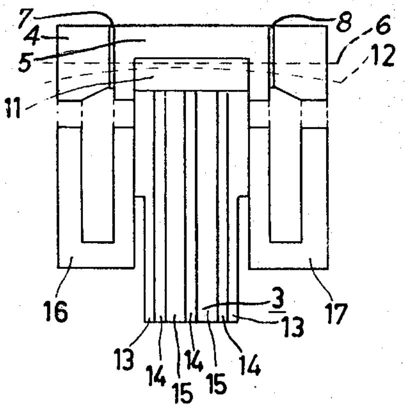
FIGURE 2 is a side view of the same magnetic head at a manufacturing stage.

FIGURE 2 diagrammatically shows the manner in which according to the invention, the completed head of FIGURE 1 is manufactured. Useful gaps 7 and 8 are formed between parts 4, 5 and 5, 6 respectively, which consist of well magnetisable material such as, for example, sintered oxidic ferromagnetic material, by pressing surfaces of said parts which have previously been made perfectly smooth against one another while heating to a temperature at which the material having to fill the gap melts (for example 600° C. and higher for glass). Said gaps may be formed in known manner exactly in parallel with one another. A gutter 11 into which fits the shielding packet 3 which may be prefabricated, if desired, is formed in the junction part 5 which has bounding surfaces for the gaps 7 and 8. The gutter 11 must have a depth at least such that it extends into the future front surface 12 of the head.

The shielding packet 3 may consist of several combinations of plates. In the embodiment shown in FIGURES 1 and 2, the number of plates is seven of which the outer plates 13 consist of unmagnetisable sintered oxidic material, the plates 14 consist of silver, and the plates 15 consist of sintered oxidic, ferromagnetic material. The plates are attached together, for example, with the use of enamel.

The shielding packet 3 is now soldered in position in the gutter 11. To this end, especially if the material to be soldered is sintered oxidic material, a metal which may be evenly moistened by solder and to which solder satisfactorily adheres is evaporation-deposited on the surfaces to be soldered, that is to say on the inner walls of the gutter 11 and the relevant outer surfaces of the shielding packet 3. The above requirements are fulfilled by first depositing Cr-Ni and on this Cu. The temperatures which occur upon soldering the packet 3 in the gutter 11 must be a few hundreds of degrees lower than that at which the gap-filling material melts. Only in this case it is prevented that stresses occur in the assembly comprising the parts 4, 5 and 6 by which the accurate parallelity of the gaps 7 and 8 would be disturbed. Use is made of lead-tin solder having a melting point from 150° C. to 200° C.

Once the packet 3 is soldered in the gutter 11, the magnetic cores 1 and 2 may be closed by means of core parts 16 and 17 which are provided with wire windings.

It is often advantageous if the core parts 16 and 17, instead of engaging the outer plates 13 of the shielding packet 3, are at angles therewith. It may thus be ensured that the coils 9 and 10 of the two cores 1 and 2 become more spaced apart so that the plates 13 of unmagnetisable material may be omitted and the shielding packet 3, and hence the height of the head at the front surface 12, may be shorter. Recesses in the outer plates of the shielding packets are redundant if the core parts are placed in inclined positions.

The resulting construction is now sawn through along a plane 18 which cuts the gutter 11, and hence possible, also the shielding packet 3 soldered in it, in the direction of length of the head. The cores 1 and 2 are then separated from each other. Subsequently the front surface 12 is obtained along the plane 18 in known manner by grinding and polishing, during which process the gaps are given the height desired.

Figures 3, 4:
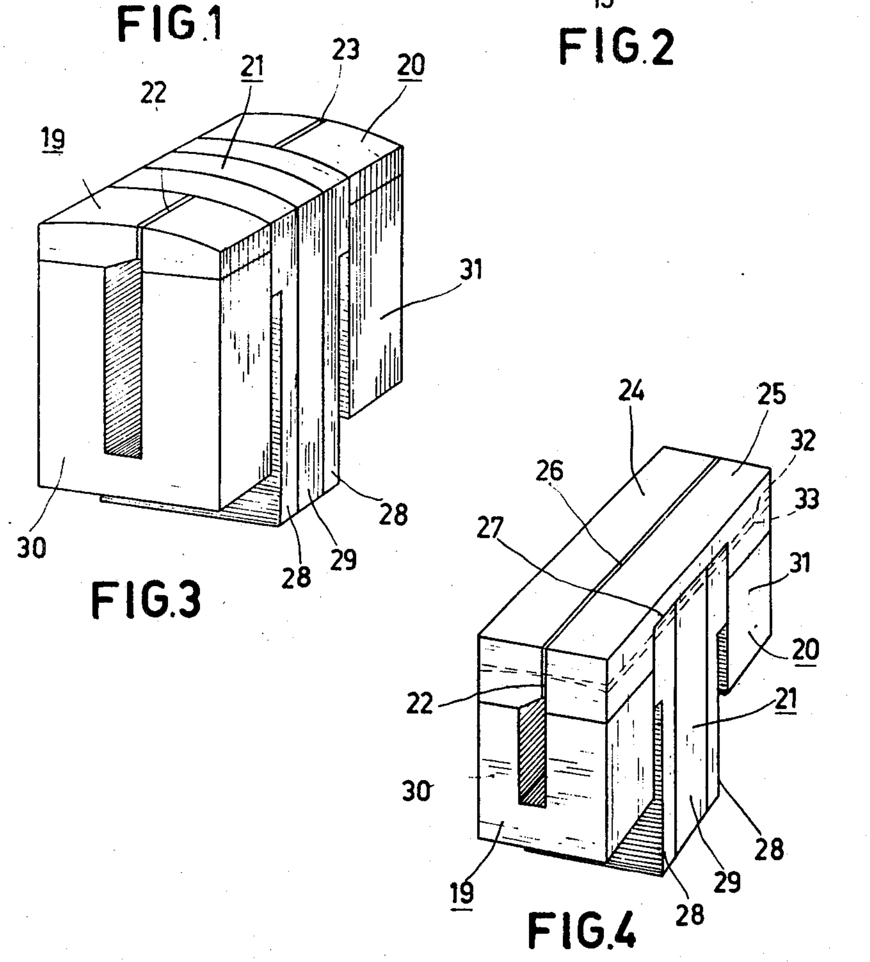
FIGURE 3 is an isometric side view of a multiple magnetic head according to the invention each gap of which governs one of two parallel tracks of magnetic recordings.
FIGURE 4 is an isometric side view of this magnetic head at a manufacturing stage.

FIGURE 4 shows the head of FIGURE 3 at a manufacturing stage. The method by which the head is manufactured is fundamentally the same as that used for manufacturing the head of FIGURE 1, except that in this embodiment the two magnetic cores 19 and 20, which are shielded from one another by a shielding packet 21, comprise gaps 22 and 23 which are exactly aligned and each of which governs one of two parallel tracks.

Start is made from two pieces 24 and 25 of sintered oxidic ferromagnetic material between which a gap 26 is formed by pressing against each other the pieces with their previously polished surfaces, possibly after having placed spacers between them, while heating to a temperature of 600° C. or higher (melting point of glass which serves as the gap-filling material and which also attaches together the pieces 24 and 25). A gutter 22 into which fits the shielding packet 21 which may have been prefabricated if desired is placed preferably at right angles to said gap.

In the example shown, the shielding packet 21 comprises three plates, namely outer plates 28 of material having good electric conductivity, for example of silver, and a central plate 29 of sintered oxidic ferromagnetic material.

After soldering the packet 21 in the gutter 27 in the manner previously described and closing the magnetic cores by means of closure pieces 30 and 31, the resulting construction is sawn through along a plane 32, whereafter a front surface 33 is formed during which process the gaps are also given the height desired.

What is claimed is:

1. A method of manufacturing a shielded multiple magnetic transducer head assembly among a plurality of pole pieces and having a magnetic surface area with a first portion for ultimately forming a first transducer head surface area and a second portion for ultimately forming a second transducer head surface area and including a common pole piece, comprising the steps of juxtaposing first and second gap defining pole pieces to opposing surfaces of said common pole piece, filling the gaps thus formed by said first and second pole pieces with a nonmagnetic gap filling material, said common pole piece having a generally U-shaped gutter substantially centrally located between and opposed to said first and second transducer head surface areas, adhering a shielding packet to the gutter of said common pole piece, removing a portion of the surface of said magnetic surface area of the resulting assembly until said shielding packet is exposed, and magnetically closing each gapped head surface of the resulting assembly.

2. The method of claim 1 wherein said shielding packet is adhered to the said gutter by an adhesive having a softening temperature lower than that of the gap filling material and said adhering includes the steps of placing said packet in said gutter, said packet and gutter having said adhesive therebetween, and heating the resultant assembly to the point at which said adhesive softens and provides a bond between said packet and said gutter.

3. The method of claim 1 wherein the steps of removing a portion of the magnetic surface area of the resulting assembly includes the steps of cutting the assembly along a plane passing through the said gutter along the length of the head and shaping the resulting assembly surface to attain the required degree of smoothness and gap height.

4. The method of claim 3 wherein the said plane passes through the said shielding packet.

5. The method of claim 1 further including the steps of depositing in said gutter a solder moistenable material, said shielding packet adhering to said gutter by solder bonding said shielding packet to said deposited material.

6. The method of claim 1 wherein all of said pole pieces including said common pole piece are sintered oxidic ferromagnetic material and further including the steps of depositing Cr-Ni in said gutter, coating said Cr-Ni with Cu, said shielding packet adhering to said gutter by solder bonding said shielding packet to said Cu.

References Cited

UNITED STATES PATENTS

| | | | |
|---|---|---|---|
| 3,224,073 | 12/1965 | Peloschek | 29—603 |
| 3,246,383 | 4/1966 | Peloschek et al. | 29—603 |
| 3,353,261 | 11/1967 | Bradford et al. | 29—603 |
| 3,357,097 | 12/1967 | Schulte | 29—603 |
| 3,103,067 | 10/1963 | Dixon | 29—492 X |
| 3,187,411 | 6/1965 | Duinker et al. | 29—603 |

JOHN F. CAMPBELL, Primary Examiner

CARL E. HALL, Assistant Examiner

U.S. Cl. X.R.

179—100.2

UNITED STATES PATENT OFFICE

CERTIFICATE OF CORRECTION

Patent No. 3,495,325 Dated February 17, 1970

Inventor(s) JULES BOS ET AL

It is certified that error appears in the above-identified patent and that said Letters Patent are hereby corrected as shown below:

Column 1, line 71, cancel "gaps are formed between each two parts of well magnet-"; and insert --gaps are formed. Different heating processes are required--;

Column 2, line 27, cancel "pars"; and insert --parts--;

Signed and sealed this 20th day of October, 1970.

(SEAL)
Attest:

Edward M. Fletcher, Jr.
Attesting Officer

WILLIAM E. SCHUYLER, JR.
Commissioner of Patents

FORM PO-1050 (10-69)

USCOMM-DC 60376-P69
★ U.S. GOVERNMENT PRINTING OFFICE : 1969 O—366-334